Figures 1, 2:
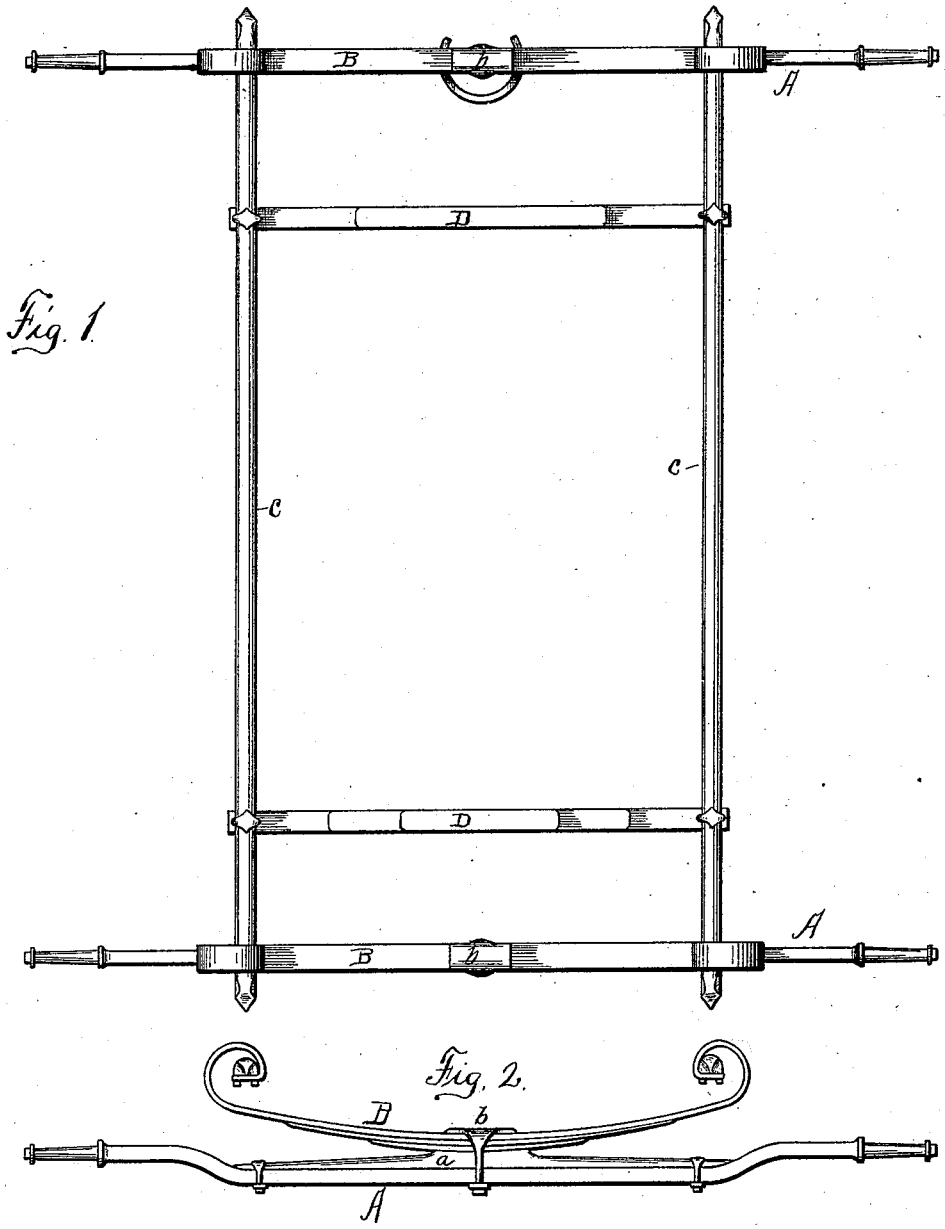

(No Model.)

G. PENN.
VEHICLE SPRING.

No. 530,649. Patented Dec. 11, 1894.

WITNESSES:
H. A. Carhart.
C. B. Kinne

INVENTOR
George Penn
BY
Smith & Denison
ATTORNEYS.

UNITED STATES PATENT OFFICE.

GEORGE PENN, OF SYRACUSE, NEW YORK.

VEHICLE-SPRING.

SPECIFICATION forming part of Letters Patent No. 530,649, dated December 11, 1894.

Application filed July 17, 1893. Serial No. 480,686. (No model.)

*To all whom it may concern:*

Be it known that I, GEORGE PENN, of Syracuse, in the county of Onondaga, in the State of New York, have invented new and useful Improvements in Vehicle-Springs, of which the following, taken in connection with the accompanying drawings, is a full, clear, and exact description.

This invention relates to improvements in vehicle springs and relates to that class known as semi-elliptic springs, having their ends provided with means for supporting the side bars of the vehicle upon which the body is mounted.

The object of this invention is to produce such a spring cheap and durable in its construction and of great utility; and to that end my invention consists in the several novel features of construction and operation hereinafter described and which are specifically set forth in the claims hereunto annexed. It is constructed as follows, reference being had to the accompanying drawings, in which—

Figure 1, shows a top plan view of the vehicle gear. Fig. 2, is a rear end view thereof.
A, are the axles constructed in the ordinary way and provided with a head-block —a— located upon the axle in the ordinary way and provided with means —b— for securing the spring —B— thereon in the usual way. The springs are formed from the ordinary strips or leaves and form what is called a leaf-spring or may be formed of a single strip as desired. The ends of the springs are bent upwardly and curved inwardly and downwardly and are then bent substantially horizontal as shown in Fig. 2 of the drawings. The horizontal bends form seats for the side bars —c— of the vehicle which are secured by clips thereto or any other well known manner. The side bars —c— are connected by cross springs —D— which are fastened to said bars by clips or in any other ordinary manner.

By the springs, constructed as described and means for connecting the same to the axles and the side bars of the vehicle, a running gear is obtained which will give the proper vertical spring movement to the body of the vehicle without undue lateral play, thus insuring comfort to the occupants of the vehicle and rendering the vehicle very desirable.

What I claim as my invention, and desire to secure by Letters Patent, is—

1. A vehicle spring having its ends bent upwardly and curved inwardly and downwardly and then bent horizontally to form a seat for the side bars of the vehicle, substantially as specified.

2. The combination with the axles of a vehicle, of the springs having their ends bent upwardly, inwardly, downwardly and then horizontally, the side bars supported by and rigidly clipped to the horizontal portions, and means for securing the springs and head block of the axle, as set forth.

In witness whereof I have hereunto set my hand this 8th day of July, 1893.

GEORGE PENN.

In presence of—
C. W. SMITH,
HOWARD P. DENISON.